(12) United States Patent
Neff et al.

(10) Patent No.: US 9,839,230 B2
(45) Date of Patent: Dec. 12, 2017

(54) DEVICE FOR DEFROSTING, WARMING AND COOKING USING A CIRCULATING FLUID

(76) Inventors: Raymond L. Neff, Half Moon Bay, CA (US); Richard P. Moran, Sammamish, WA (US)

(*) Notice: Subject to any disclaimer, the term of this patent is extended or adjusted under 35 U.S.C. 154(b) by 1056 days.

(21) Appl. No.: 13/425,400

(22) Filed: Mar. 20, 2012

(65) Prior Publication Data

US 2012/0251695 A1    Oct. 4, 2012

Related U.S. Application Data

(60) Provisional application No. 61/469,868, filed on Mar. 31, 2011.

(51) Int. Cl.
| | | |
|---|---|---|
| *A47J 27/10* | (2006.01) | |
| *A23L 1/01* | (2006.01) | |
| *A23L 5/10* | (2016.01) | |
| *A47J 27/00* | (2006.01) | |

(52) U.S. Cl.
CPC ............. *A23L 5/13* (2016.08); *A23L 5/15* (2016.08); *A47J 27/004* (2013.01); *A47J 27/10* (2013.01); *A23V 2002/00* (2013.01)

(58) Field of Classification Search
CPC . A47J 27/004; A47J 27/10; A23L 5/13; A23L 5/15; A23V 2002/00
USPC .......... 392/445, 447; 99/330, 333, 403, 468, 99/483, 402, 410, 413, 414, 426, 449, 99/416; 211/11, 46; 426/509
See application file for complete search history.

(56) References Cited

U.S. PATENT DOCUMENTS

| | | | | | |
|---|---|---|---|---|---|
| 3,613,550 | A | * | 10/1971 | Thompson | 99/330 |
| 4,113,623 | A | * | 9/1978 | Koether et al. | 210/167.28 |
| 4,138,936 | A | * | 2/1979 | Williams | 99/282 |
| 4,309,940 | A | * | 1/1982 | Lowerre, Jr. | 99/281 |
| 4,446,778 | A | * | 5/1984 | Cipelletti | 99/455 |
| 4,489,235 | A | * | 12/1984 | Porteous | 219/437 |
| 4,569,277 | A | * | 2/1986 | Stiglich | 99/330 |

(Continued)

OTHER PUBLICATIONS

Polyscience Corporation; www.CuisineTechnology.com 6600 W Touhy Ave.; Niles, IL 60714 USA. Product Description Page for Sous Vide Thermal Circulator model 7306C; accessed on Apr. 20, 2012 at Internet address http://www.cuisinetechnology.com/sousvide-thermal-circulator.php; 1 page.

*Primary Examiner* — Eric Stapleton
(74) *Attorney, Agent, or Firm* — G. Marlin Knight

(57) ABSTRACT

A device that defrosts, warms and/or cooks items such as food in a temperature controlled circulating liquid is described. Embodiments of the device are particularly useful for sous vide cooking that uses relatively low temperatures and long cooking times. The active components including a pump and heater are placed in a self-contained base unit. When the base unit and the liquid-containing vessel or carafe are engaged, the liquid in the carafe is actively circulated by the pump in the base unit. The liquid is also heated as required as it flows through the base unit. Embodiments of the invention that are designed for the consumer can include an easily detachable, lightweight carafe that can be conveniently filled, emptied and cleaned while detached from the base unit. The detachable carafe can be designed with no electrical components so that it can be immersed in water for cleaning.

10 Claims, 8 Drawing Sheets

(56) References Cited

U.S. PATENT DOCUMENTS

| | | | | |
|---|---|---|---|---|
| 4,613,745 A * | 9/1986 | Marotta et al. | | 392/445 |
| 4,688,475 A * | 8/1987 | Witt et al. | | 99/325 |
| 4,732,080 A * | 3/1988 | Vita | | 99/330 |
| 4,742,455 A * | 5/1988 | Schreyer | | 700/90 |
| 4,761,295 A * | 8/1988 | Casey | | 426/549 |
| 4,812,625 A * | 3/1989 | Ceste, Sr. | | 219/497 |
| 4,821,632 A * | 4/1989 | Bolzani et al. | | 99/330 |
| 4,967,648 A * | 11/1990 | Helbling | | 99/280 |
| 4,969,392 A * | 11/1990 | Steele et al. | | 99/282 |
| 4,989,668 A * | 2/1991 | Shimizu | | 165/47 |
| 5,046,410 A * | 9/1991 | Shimizu | | 99/455 |
| 5,060,560 A * | 10/1991 | VanDeMark | | 99/337 |
| 5,072,660 A * | 12/1991 | Helbling | | 99/280 |
| 5,090,305 A * | 2/1992 | Lehman | | 99/330 |
| 5,097,759 A * | 3/1992 | Vilgrain et al. | | 99/483 |
| 5,103,801 A * | 4/1992 | Herring et al. | | 126/374.1 |
| 5,123,337 A * | 6/1992 | Vilgrain et al. | | 99/483 |
| 5,183,998 A * | 2/1993 | Hoffman et al. | | 219/492 |
| 5,186,097 A * | 2/1993 | Vaseloff et al. | | 99/330 |
| 5,351,605 A * | 10/1994 | Sai et al. | | 99/330 |
| 5,379,682 A * | 1/1995 | Andrew et al. | | 99/281 |
| 5,392,639 A * | 2/1995 | Manz | | 73/61.76 |
| 5,542,344 A * | 8/1996 | Koether et al. | | 99/330 |
| 5,603,224 A * | 2/1997 | Scaringe et al. | | 62/125 |
| 5,638,689 A * | 6/1997 | Scaringe et al. | | 62/77 |
| 5,676,041 A * | 10/1997 | Glucksman et al. | | 99/286 |
| 5,706,718 A * | 1/1998 | Svensson | | 99/416 |
| 5,749,285 A * | 5/1998 | Dorner et al. | | 99/348 |
| 5,932,940 A * | 8/1999 | Epstein et al. | | 310/40 MM |
| 5,934,573 A * | 8/1999 | Weterrings et al. | | 239/650 |
| 6,056,985 A * | 5/2000 | Fluckiger et al. | | 426/392 |
| 6,063,421 A * | 5/2000 | Barravecchio | | 426/231 |
| 6,142,063 A * | 11/2000 | Beaulieu et al. | | 99/283 |
| 6,152,327 A * | 11/2000 | Rhine et al. | | 222/88 |
| 6,199,472 B1 * | 3/2001 | Greiwe | | 99/291 |
| 6,216,358 B1 * | 4/2001 | Pelisser | | 34/62 |
| 6,301,961 B1 * | 10/2001 | Rolfes et al. | | 73/328 |
| 6,460,735 B1 * | 10/2002 | Greenwald et al. | | 222/146.1 |
| 6,612,224 B2 * | 9/2003 | Mercier et al. | | 99/282 |
| 6,672,200 B2 * | 1/2004 | Duffy et al. | | 99/283 |
| 6,953,913 B1 * | 10/2005 | Hara et al. | | 219/432 |
| 7,021,197 B2 * | 4/2006 | Chen et al. | | 99/291 |
| 7,210,401 B1 * | 5/2007 | Rolfes et al. | | 99/289 R |
| 7,268,698 B2 * | 9/2007 | Hart et al. | | 340/870.07 |
| 7,331,277 B2 * | 2/2008 | Hart et al. | | 99/289 R |
| 7,458,315 B2 * | 12/2008 | Hart et al. | | 99/279 |
| 7,677,158 B2 * | 3/2010 | McDuffie et al. | | 99/302 R |
| 7,770,510 B2 * | 8/2010 | Hart et al. | | 99/291 |
| 7,798,053 B2 * | 9/2010 | Clark et al. | | 99/281 |
| 7,798,373 B1 * | 9/2010 | Wroblewski et al. | | 222/209 |
| 8,087,346 B2 * | 1/2012 | Webster et al. | | 99/283 |
| 8,225,708 B2 * | 7/2012 | Lassota et al. | | 99/282 |
| 2002/0121197 A1 * | 9/2002 | Mercier et al. | | 99/279 |
| 2002/0130137 A1 * | 9/2002 | Greenwald et al. | | 222/54 |
| 2002/0152895 A1 * | 10/2002 | Duffy et al. | | 99/279 |
| 2004/0226452 A1 * | 11/2004 | Lyall, III | | 99/279 |
| 2005/0011364 A1 * | 1/2005 | Chen et al. | | 99/275 |
| 2005/0061156 A1 * | 3/2005 | Hart et al. | | 99/275 |
| 2006/0090653 A1 * | 5/2006 | McDuffie et al. | | 99/279 |
| 2007/0137223 A1 * | 6/2007 | Brekke | | 62/64 |
| 2007/0151466 A1 * | 7/2007 | Clark et al. | | 99/467 |
| 2008/0028944 A1 * | 2/2008 | Webster et al. | | 99/283 |
| 2008/0041233 A1 * | 2/2008 | Bunn | | 99/281 |
| 2008/0066624 A1 * | 3/2008 | Taylor et al. | | 99/330 |
| 2008/0148954 A1 * | 6/2008 | Maldanis | | 99/279 |
| 2009/0050835 A1 * | 2/2009 | Boise et al. | | 251/320 |
| 2009/0136639 A1 * | 5/2009 | Doglioni Majer | | 426/431 |
| 2009/0235826 A1 * | 9/2009 | Hart et al. | | 99/288 |
| 2009/0255408 A1 * | 10/2009 | Lassota et al. | | 99/282 |
| 2009/0258114 A1 * | 10/2009 | Lassota et al. | | 426/78 |
| 2011/0185915 A1 * | 8/2011 | Eades et al. | | 99/331 |

* cited by examiner

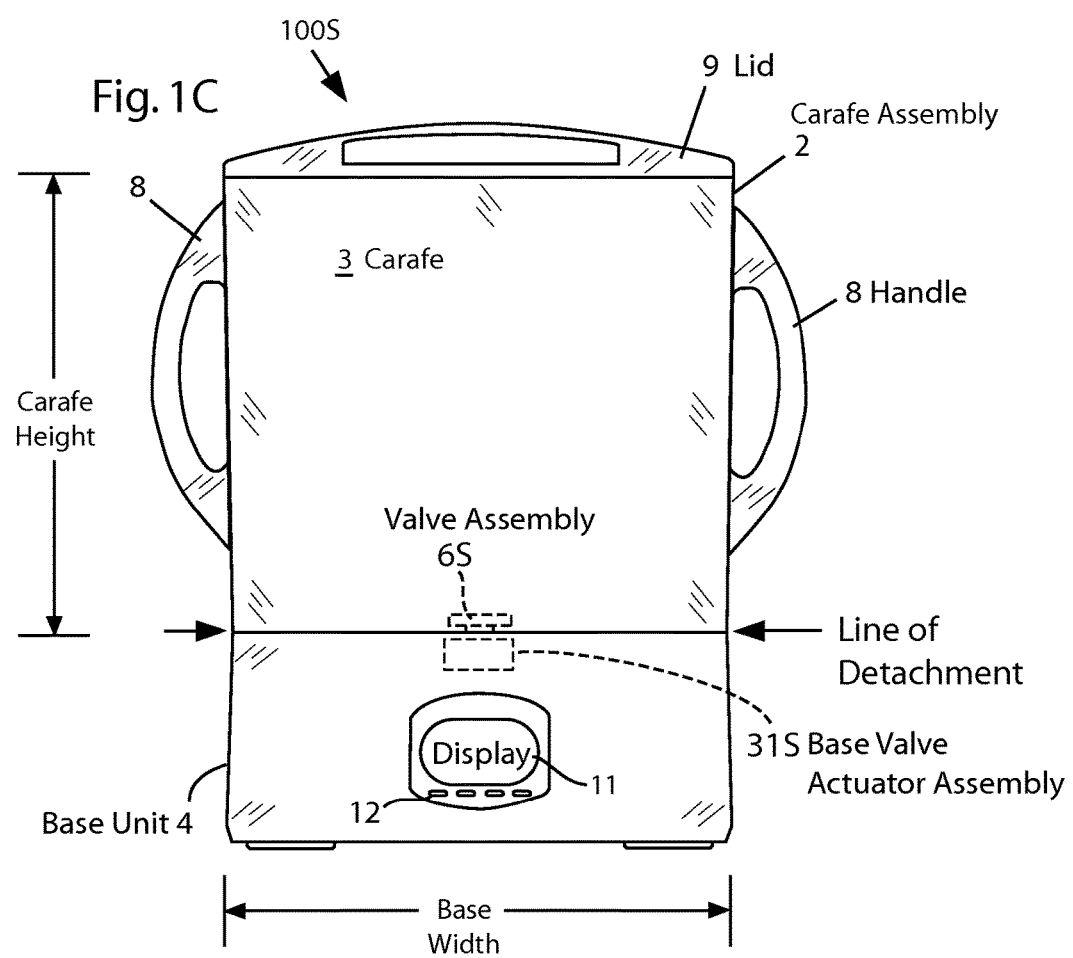

DEVICE FOR DEFROSTING, WARMING AND COOKING USING A CIRCULATING FLUID

RELATED APPLICATION

This application claims the priority date of U.S. Provisional Application No. 61/469,868, filed on Mar. 31, 2011. This prior application is incorporated herein by reference in its entirety.

FIELD OF THE INVENTION

The present invention relates generally to devices for defrosting, warming and/or cooking food in a liquid and methods for their use. More specifically, the present invention relates to such devices that include means for actively circulating the liquid around the food.

BACKGROUND

Although the invention described herein can be used in many ways, a particular method of use is in what is popularly called sous vide cooking. The French term "sous vide" is widely used in English to refer to a method of slowly cooking food in vacuum sealed plastic pouches. The term "sous vide" literally means "under vacuum," and it is sometimes used in the more literal sense to refer to the process of creating the food-filled vacuum sealed pouches. Accordingly a sous vide process can refer to the method of sealing food in the bags or to the cooking process. Except where noted otherwise herein, the term sous vide will be used to mean the cooking method.

Sous vide typically differs from conventional cooking methods in two ways: 1) the raw food is vacuum sealed in appropriate plastic pouches, and 2) the food is cooked in the sealed pouch using precisely controlled low temperature in water. Although the relevant process for the invention typically uses raw food, it is also possible to partially or fully cooked food. When precooked food is used the process is normally called reheating rather than cooking.

Temperatures used in sous vide cooking are lower than those normally used for cooking foods by frying or in boiling water. Most sous vide cooking is performed between 130 to 180 degrees Fahrenheit (° F.) with a typical temperature being around 140° F. (60° C.). Even though the temperature is low, it is, nevertheless, important that the temperature be well controlled. While some foods will cook in a few minutes, sous vide cooking time can extend to tens of hours. The purpose of the lower temperature and longer cooking duration is to maintain the integrity of the food ingredients, improve the taste over conventionally prepared foods and induce biochemical reactions which improve the quality of the food, for example, to improve the tenderness of lesser cuts of meat.

As the sous vide name suggests, vacuum sealing in a plastic bag is generally used to remove air from contact with the food. The exclusion of air from the cooking bag is not required for cooking but has some advantages. It allows cooked food to be stored longer. Another advantage of using a vacuum sealed cooking bag is the exclusion of oxygen. Reducing oxidation during the extended cooking time can be particularly important for cooking meat, for example, because the fat may become rancid with prolonged exposure to oxygen in the air at elevated temperature. Reducing the level of oxygen also dramatically decreases the opportunity for aerobic bacteria growth in the food. In addition, the vacuum condition reduces the tendency of the sealed bags to float, and improves the efficiency of contact between the cooking fluid and the food.

An example of a particular sous vide cooking pouch is described in U.S. Pat. No. 6,056,985 to Fluckiger et al. (May 2, 2000). The material for the bag is flexible and transparent which allows direct observation of the food while it is cooking. Fluckiger uses heat-shrinking material that can be heated to at least the pasteurization temperature of the food therein. He suggests a temperature tolerance up to about 110° C. Fluckiger includes a special self-sealing orifice in the bag that allows insertion of a temperature sensor to measure the temperature inside the food during heating and cooling phases. One end of the sensor with an attached wire remains outside the bag to allow the data to be acquired and used by the control system. The pass-through orifice in the bag re-seals when the temperature sensor is removed.

The required degree of accuracy and constancy of cooking temperature varies with the food and cooking time. However, sous vide style cooking can benefit from a cooking device that can maintain a precise temperature over long periods of time.

There are several types of sous vide style cooking devices that have been described. One way to divide the devices is whether they provide a means for actively circulating or stirring the liquid. The use of circulation pumps, for example, can provide better control over the temperature. But many units omit circulation means and rely on convection presumably to save on the complexity and/or cost.

One type of device that includes circulation capability consists of an integrated unit that attaches to the rim of a general purpose cooking pot. The user interface panel, process control electronics and pump are positioned above the level of the liquid. Tubes which provide intake and output ports for a circulation pump extend down into the liquid.

U.S. patent application 20080066624 by Taylor, et al. (published Mar. 20, 2008) describes a sous vide cooker with an integrated immersion circulator. The appliance comprises a vessel for holding a liquid bath, one or more heater units, an immersion circulator, one or more temperature sensors, and a user input device. The sensors monitor the temperature of the liquid bath and provide feedback to the heating units and the immersion circulator. This feedback allows the heating units and immersion circulator to maintain the temperature at the desired setting. The heating chamber is open on the top, allowing the introduction of the liquid comprising the liquid bath and vacuum packed food items for cooking. The heating chamber is equipped with a drain for removing the liquid.

A cooker that relies on convection is described in U.S. patent application 20110185915 by Eades; et al. (published Aug. 4, 2011). The sous-vide cooker includes a cooking chamber and a heating system. A plate with holes in it is said to create passive circulation. The heating system comprises a heating unit, one or more temperature sensors, a proportional-integral-derivative (PID) controller, and a control panel.

U.S. Pat. No. 5,542,344 to Koether et. al. discloses a sous vide rethermalizer appliance including two tanks in a fixed arrangement. The first tank is used for heating sous vide pouches to a temperature of approximately 140° F. The second tank is used for "finishing" where the sous vide pouches are cooked for a short time period at approximately 180° F. to complete cooking of the food in the pouches prior to serving. Each tank includes a heater and relies on convection. Water is automatically added to the tanks when appropriate by the control system. A timing and memory unit retrieves set point temperatures corresponding to the designated vat functions.

These prior art sous vide cooking devices either include a detachable circulation means that is immersed into the general purpose cooking vessel by the user or include a dedicated cooking vessel with a permanently attached circulation means.

The above described prior art devices have a number of short-comings when compared to the present invention.

SUMMARY OF THE INVENTION

The present invention comprises a cooking-type device that can defrost, warm and/or cook food items in a temperature controlled circulating liquid such as water. Embodiments of the device are particularly useful for sous vide cooking. An embodiment of the invention includes a liquid-holding vessel (carafe) sized to allow the selected food item to be immersed in the liquid and includes means for operably engaging with the base unit. The liquid can be water or any other non-flammable liquid usable for cooking. The active components are contained in the self-contained base unit. When the base unit and carafe are engaged, the liquid in the carafe can be actively circulated by flowing through a pump in the base unit. The liquid is also heated as required as it flows through the base unit. It is an object of the invention to provide automated, precise heating and active circulation of the fluid in the carafe during the warming or cooking process.

Embodiments of the invention that are designed for the consumer can include an easily detachable, lightweight carafe that can be conveniently filled, emptied and cleaned while detached from the base unit. Preferably the carafe has no electrical components and can be immersed in water for cleaning.

In one embodiment the cooking vessel has two self-sealing liquid-tight valves (one for the inlet and one for the outlet) that allow the carafe to hold the liquid and food item(s) while detached if desired. In an alternative embodiment a single integrated self-sealing valve assembly includes the inlet and outlet ports. The liquid-filled carafe can be positioned on the base so that the self-sealing valve(s) engage with mating receptacle(s) on the base that include means for opening the valve(s) to allow the liquid to flow out from the carafe into the base through one port and return through the other port. The base unit pumps and heats the liquid according to user selected parameters.

Embodiments of the device include optional means for determining whether the fluid flow through the base is sufficient to allow the heater to operate safely. One embodiment uses two pressure sensors with one measuring the pressure on the inlet side of the pump and the second one measuring the pressure on the outlet side of the pump. When the fluid is flowing properly the difference between pressures at the inlet and outlet of the pump will be greater than a predetermined value which is a function of the particular design of the device and can be empirically determined. Another embodiment uses a single differential pressure sensor to measure the difference between the inlet and outlet pressures. The control system electronics in these embodiments switches off electrical power to the heating element if the flow is too low as indicated by a pressure difference that is too low.

BRIEF DESCRIPTION OF THE FIGURES

FIG. 1C is an illustration of a front view of a device according to an embodiment of the invention including an integrated inlet and outlet valve, shown with the detachable carafe attached to the base.

DETAILED DESCRIPTION OF THE INVENTION

A device embodying the invention can be considered to be a general purpose temperature controlled water bath. The embodiments described below are for devices intended primarily for use with food, but devices according to the invention can be used in any applications not involving food where a temperature controlled nonflammable fluid bath is useful which might include a variety of hobby, craft and art activities and so on.

Embodiments of the invention described herein can be used generally for defrosting, warming or cooking food, but these embodiments are particularly useful for sous vide cooking which requires long cooking times, relatively low temperature and benefits from well-controlled temperature. Embodiments of the device have a base unit that is separate from the cooking carafe, which can be moved or be placed independently. The base unit contains the active components including the pump, heater, and control system electronics. The embodiments described herein are designed so that the cooking carafe sits on top of the base unit, but other embodiments could have other physical arrangements, such as side by side or even several feet away connected by hoses.

Figure 1A:
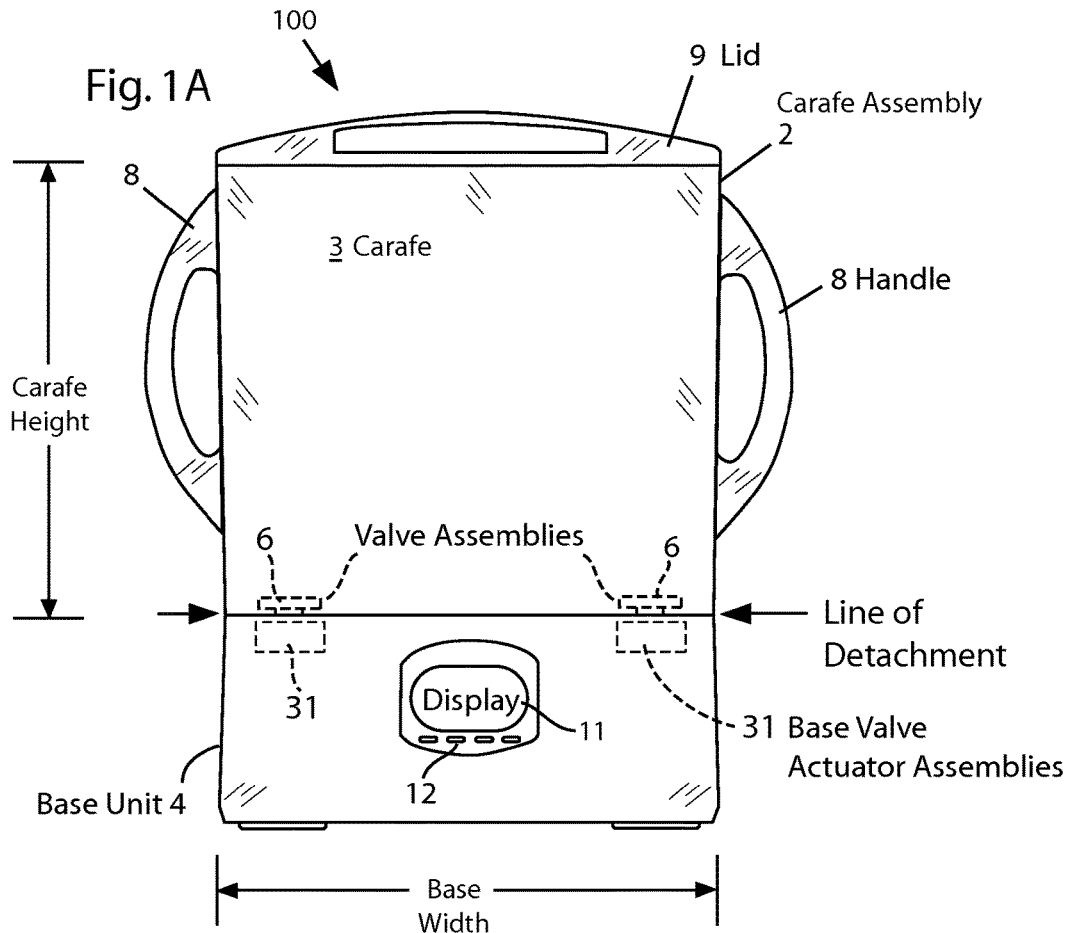
FIG. 1A is an illustration of a front view of a device according to an embodiment of the invention including separate inlet and outlet valves, shown with the detachable carafe attached to the base.

An embodiment of a device according to the invention with a detachable carafe assembly 2 including carafe 3 is illustrated in FIG. 1A. A typical food-related use of the device begins with the operator placing the food item, which can be in a sous vide type pouch, in the detached carafe and then filling the carafe with water to the point where the item is immersed. The device can conveniently use water as the circulating liquid, but other cooking liquids can also be used. If the properties of the cooking fluid differ significantly from water, then the type of circulation pump needs to be selected accordingly. The filled carafe is then mounted on the base unit 4 to establish fluid communication. In operation the device will pump the water in the carafe through the base unit to heat the water to a controlled temperature while being circulated in the carafe to keep the temperature homogeneous. The user interface and control system can be in accordance with prior art and can vary in complexity from very simple to multiple heating phase programming according to intended use, price, etc.

An advantage of the invention is that it allows food to cook very evenly at the precise programmed temperature using circulating liquid. An embodiment of the invention can be designed to allow cooking times that extend to the tens of hours required in the sous vide method. The low temperature method typically allows a large window of time during which the food can be left in the device beyond the minimum cooking time without overcooking. Accordingly the device designed for sous vide cooking can remain on, and not turn off automatically, until the operator ends the process. Allowing the food to cool unattended for too long can allow dangerous pathogens to grow. The detachable carafe assembly can be removed for emptying and cleaning. Because no electrical components are required in the carafe assembly, embodiments can be made safe for water immersion or cleaning in a dishwasher.

FIG. 1A is an illustration of a front view of a device 100 according to an embodiment of the invention with the carafe assembly 2 attached to the base unit 4. The base unit 4, which will be described more fully below, contains all of the active components such as the pump, heating element and control system. Embodiments of the invention can include a wide range of sizes depending on the intended use. The liquid-holding carafe assembly can be made in a variety of shapes and can even be a soft plastic bag. In the embodiment shown in FIG. 1A the liquid-containing carafe assembly 2 is generally rectangular in cross section and is made of rigid materials such as a combination of plastic or metal. The carafe 3 can conveniently be made from a generally transparent material to allow the food item to be viewed during the heating process. The carafe 3 is the container in which the actual cooking, warming or defrosting takes place. The carafe assembly 2 in this embodiment includes carafe 3, two side-mounted handles 8 and removable lid 9. The removable lid prevents excess evaporation of the cooking water during operation. This carafe assembly 2 also includes two valve assemblies 6 positioned in the bottom surface of carafe 3. The two valve assemblies 6 are on the inside in this view and could be hidden from view. The valve assemblies 6 are open when attached to the base and automatically close when the carafe is removed.

Other embodiments can include different handle and lid arrangements or omit these features. In this embodiment carafe assembly 2 is easily detachable from the base unit 4 making it convenient for use in a home environment. In other embodiments the carafe assembly can be designed not to be detachable in normal use, can be much larger and can remain more or less permanently attached to the base unit. In the embodiment of FIG. 1A, the carafe assembly 2 and base unit 4 are separate and self-contained. The base unit 4 is designed so that it can remain stationary on a counter, while the carafe assembly 2 can be easily removed for filling, emptying and cleaning.

The carafe 3 is generally sized to allow immersion of the intended food item in water or other non-flammable liquid usable for cooking. The food item can be vacuum sealed in a plastic pouch of the type used in sous vide cooking. The food can be raw, partially cooked, fully cooked and/or frozen. The carafe can include molded features or a removable rack for holding one or more food items in a position optimal for cooking. A consumer oriented embodiment with a detachable carafe should generally be large enough to hold a useful amount of food and not so large as to be unwieldy in a home kitchen. For example, a general purpose carafe for home use might have approximately 2 or 3 gallons of capacity.

An embodiment designed with a detachable carafe can also include multiple interchangeable carafes which can be of different sizes and made from different materials. Carafes can also be designed for different specific uses. An example of a special purpose carafe might be one designed for warming baby bottles. Such a special purpose carafe could be made smaller than the general purpose one and might include molded features or a rack that allowed the bottles to be held upright and not be totally immersed in the water. Other special purpose carafes could be designed for non-food-related uses.

An embodiment of the invention may also include multiple separate carafes which are simultaneously mounted on a single base unit, allowing separate food items to be cooked at different temperatures and/or for different period of time. A base unit that could simultaneously operate with two or more carafes would need to have duplicates of some of the essential components for each carafe, but a single microcontroller might be used with multiplexors, for example, to control the pumps and heaters for multiple carafes.

Figure 1B:
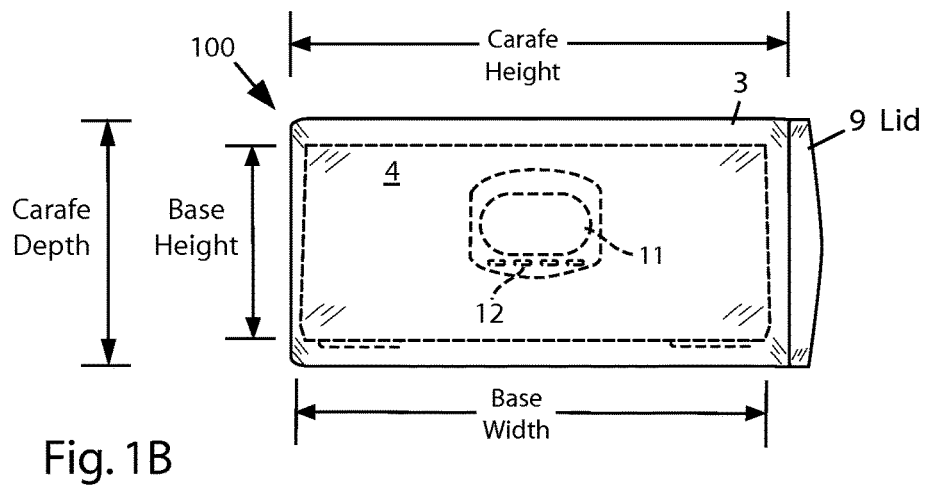
FIG. 1B is an illustration of a side view of a device according to an embodiment of the invention with the base stored in the carafe assembly.

One embodiment of the invention illustrated in FIG. 1B uses selected dimensions of the carafe 3 and the base 4 such that the base can be stored inside (nest in) the carafe to occupy less space when not in use. In this embodiment the height of the base unit is less than the interior depth of the carafe, and the width of the base unit is less than the interior height of the carafe.

The components and materials for embodiments of the device must be selected for the intended operating temperature range over extended times. The lower operating temperature limit is essentially ambient/room temperature for a device which only uses a heater to control the liquid temperature. Some applications such as defrosting frozen foods and warming baby bottles can use lower temperatures than are appropriate for cooking food. For example, the target temperature for baby bottles is approximately 98 F, which is below cooking temperature. On the upper end, the temperature in the device should be limited to below the boiling point of the liquid being used. Therefore, the range of temperatures could be from approximately room temperature to about 185° F. for use with water.

The carafe 3 in the embodiment of FIG. 1A includes two valve assemblies 6 that provide inlet and outlet ports that allow the cooking fluid surrounding the food item to circulate through the pump and over the heating element in the base. The forced flow causes the temperature of the fluid to be more homogeneous than is achievable using convection. The valve assemblies 6 are preferably mechanically biased in a closed liquid-tight position when the carafe is separated from the base. When the carafe is mounted to the base, fluid communication is established with the tubing system in the base through the valve assemblies 6 which are held open by mating actuating structures in the base valve actuator assemblies (BVAA) 31 that mate with valve assemblies 6 in the carafe.

In one exemplary embodiment the inlet and outlet valve assemblies 6 are mechanically biased in the sealed position by a spring urging a piston (stopper) against a liquid sealing surface. The valve assemblies 6 are, therefore, biased in the closed position when the carafe 3 is detached from the base. The BVAAs 31 include mating valve actuators positioned near the end of the tube that allow flow into and out of the tubing system in the base. When the carafe is mounted on the base, liquid communication is established by the valve actuator moving the piston/stopper away from the ring seal allowing fluid in the carafe to flow into or out of the mating tube in the base under the influence of the pump.

When attached to the base, the carafe and the base are in fluid communication through open valve assemblies 6, but the fluid is contained in the system. The base unit 4 in this embodiment includes a mounting surface for the carafe to be positioned on top of the base. The mounting surface includes base valve actuator assemblies (BVAA) 31 that mate with valve assemblies 6 in the carafe. The BVAA 31 have mating tubing connected to the pump and heater in the base. The liquid is drawn in from the carafe through one mated valve and forced back out into the carafe through the other mated valve.

Figure 2:
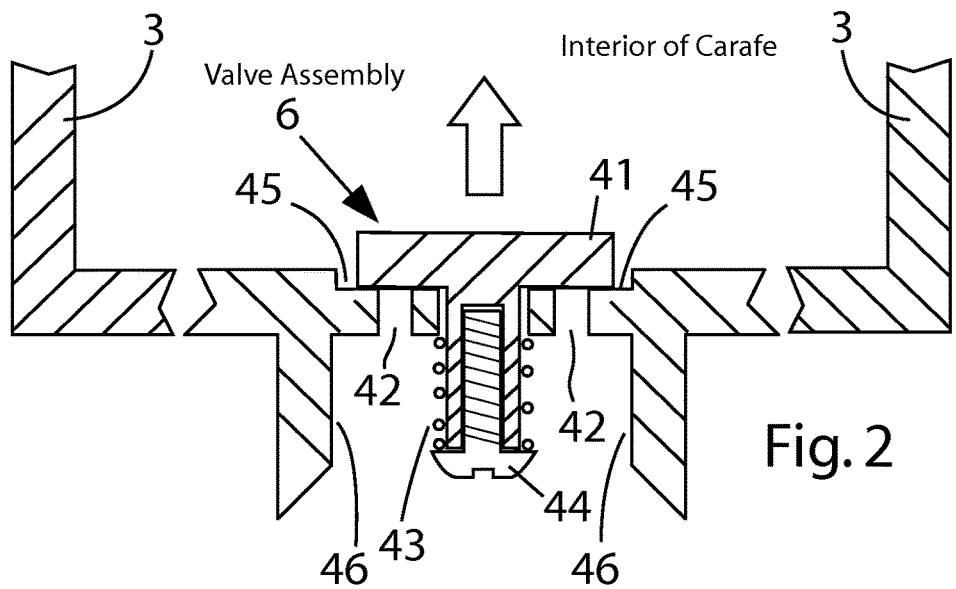
FIG. 2 is an illustration of a cross section view of a first embodiment of a valve assembly used in an embodiment of the invention.
Figure 4:
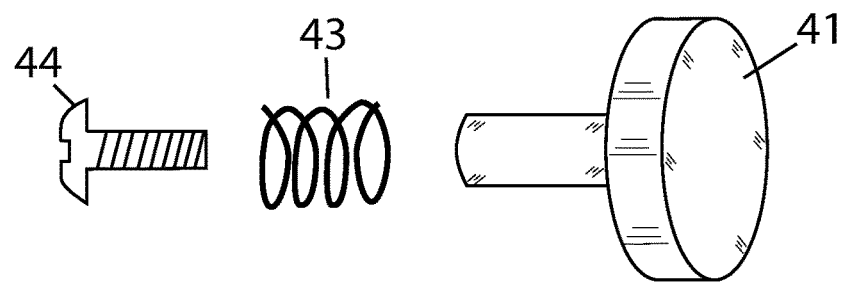
FIG. 4 is an illustration of an exploded view of selected components of the embodiment of a valve assembly illustrated in FIG. 2.

An exemplary embodiment of one possible valve assembly 6 in cross section is illustrated in FIG. 2. The examples of mating valve assemblies illustrate the principles involved, but other valve assemblies can be substituted according to the prior art. Piston 41 is shown in the closed position with the carafe detached from the base. Piston 41 seals off passageways 42 when the carafe is detached from the base. When the carafe is attached to the base piston 41 is moved up to allow the liquid to flow through passageways 42 which open to the interior of the carafe. (See FIG. 9 for an illustration of a piston in the open position in an alternative embodiment described below). Piston 41 is biased in the closed position by spring 43 which is held in position by threaded bolt 44 which is screwed into mating threads in the shaft of piston 41. The valve assembly 6 is illustrated in principle, and a practical embodiment can optionally include guides and seals between the piston 41 and carafe mating surface 45 as are known in the art to improve or enhance the sealing function and piston movement. FIG. 4 is an illustration of an exploded view of selected components of the valve assembly 6 illustrated in FIG. 2. The piston 41 has a generally circular-shaped cap which in turn seals against a generally circular-shaped mating surface 45.

Figure 3:
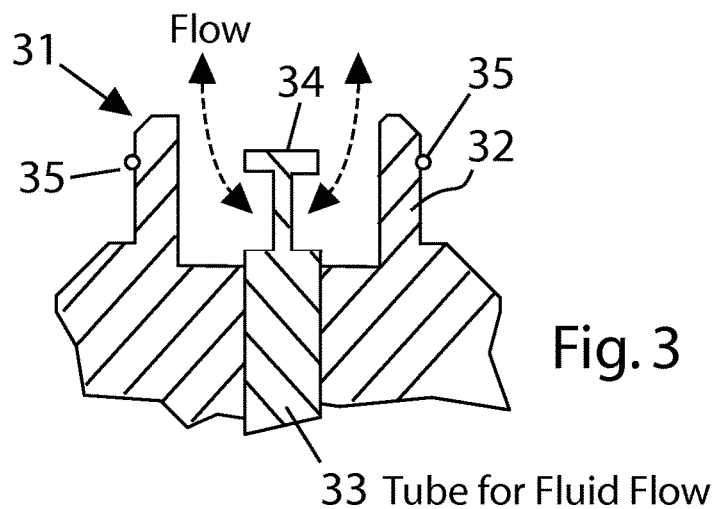
FIG. 3 is an illustration of a cross section view of a first embodiment of a base valve actuator assembly used in an embodiment of the invention.

An exemplary embodiment of a base valve actuator assembly (BVAA) 31 in cross section is illustrated in FIG. 3. Valve actuator 34 is a rigid protruding member that engages the end of the bolt 44 to push piston 41 up to open the valve assembly 6 in the carafe when the components are physically pressed together. When BVAA 31 is mated with valve assembly 6, the valve actuator 34 moves the piston 41 up to compress spring 43 and open passageways 42 to allow fluid to flow into or out of the carafe depending on the pressure differential. The fluid path in BVAA 31 is into or out of tube 33 through openings in valve actuator 34. The fluid is prevented from flowing out of the sides of the valves by contact between a protruding ring 32 in the BVAA 31 and mating protruding ring 46 in the valve assembly 6. In this embodiment an o-ring 35 is used to make a fluid-tight seal between the surfaces of rings 32, 46.

The operation of the base unit 4 will be further discussed with reference to FIG. 5, which is a schematic illustration of selected components of a base unit according to a first embodiment of the invention. The major components of the base unit 4 in this embodiment are:
  A) Pump 51 and pump relay 51R;
  B) Heater assembly 52 and heater relay 52R;
  C) Tubing system 56 for fluid flow;
  D) Control System Electronics (CSE) Unit 60;
  E) Pressure sensors 54;
  F) Temperature sensors 55;
  G) Valve Actuator Assemblies 31
  H) User interface, including:
    1) Display 11;
    2) Keypad 12.

The pump 51 and heating assembly 52 are arranged in a serial fluid flow path. The pump 51 and heater assembly 52 can be operated independently through the respective relays. Electrical power to the heater assembly 52 and pump 51 is separately controlled via standard switching devices such as mechanical relays, solid state relays (SSR), or TRIACs. The pump is normally on during operation to circulate the liquid and keep the temperature gradient in the liquid low. In this embodiment the pump 51 and heater assembly 52 are either on or off according to the state of their respective relays. The pump 51 is intended in this embodiment to run continuously at a constant rate during operation. A variable output pump could also be used along with additional appropriate controls and firmware. The heater relay 52R to power the heating element is turned on when needed to raise the temperature of the liquid and turned off when the target temperature is reached. In other embodiments a variable output heater can be used with the addition of appropriate controls and firmware.

Temperature and pressure sensors in the base are used to monitor and respond to the measured parameters. A standard user interface can be provided to allow user input of cooking times and/or temperatures and to display desired information such as the current temperature, the target temperature, time elapsed in the cooking or warming period.

The base unit 4 contains all of the active components of the device. The various sections of tubing 56 can be rigid or flexible tubing. The base in this embodiment provides a mounting surface on top of the base for the detachable carafe assembly 2 including the carafe 3. The BVAAs 31 which mate with the valve assemblies 6 in the carafe are positioned on the mounting surface in the base.

The pump 51 should be a food-grade liquid pump capable of operating with liquid temperatures at least up to the maximum shutdown temperature. For example, a pump usable up to 95° C. and providing approximately 2 GPM of flow should be adequate for a system for home use. In this embodiment the physical orientation of the carafe above the base unit containing the pump, makes it unnecessary for the pump to be self-priming. In addition, this physical orientation provides a somewhat neutral differential pressure between the inlet and outlet sides of the pump, as the static head on the inlet and outlet sides are approximately equal. As a result, the pump is only required to overcome the friction head loss introduced by the valves, tubing and other components in the fluid path. A pump specified to provide the requisite flow into a 24" head should be sufficient for home use. The pump is controlled by the control system electronics (CSE) unit 60. When the unit is in operation, the pump circulates water from the one valve assembly 6 of the carafe, through the heater assembly 52, back to the other valve assembly 6 of the carafe. The pump is not submerged.

The heater assembly 52 is a circulation heater. When the pump is running, the liquid from the carafe inlet is forced through the chamber in the heater assembly 52 and across the immersion heating element. The required heater power is a function of the total volume of fluid in the system and the desired heating rate. A circulation heater capable of supplying power in the range of 1000 W-1500 W should be adequate for a device used in the home. The heating element can be similar to commercially available elements intended for heating water for human consumption. The heater is controlled by the CSE in response to the temperature sensors to attain and then maintain the water at the desired cooking temperature. The heater can also be automatically shut down when potentially unsafe conditions are detected.

The CSE is a microcontroller 61 based electronic assembly which provides all intelligence for operation of the device. Information is acquired from and displayed to the user via the display 11 and keypad 12, under the control of the CSE. A set of computer program instructions that constitute the CSE firmware are created according to standard principles. The firmware is executed by a microprocessor included in the microcontroller 61. During operation, the CSE firmware, implements temperature control employing the temperature sensors 55 and heater relay 51R, to attain and then maintain the desired temperature. The temperature of the liquid is measured at two locations, preferably near the BVAAs 31 at the outlet and the inlet to the carafe, by temperature sensors 55. These sensors are electrically connected to the temperature sensor input blocks 62, 63 in the CSE which responds to the measures values. Depending on the type of sensor used, the device may include circuitry on the CSE to excite each thermistor and to amplify and filter the raw signal. A microcontroller with built-in A/D converter(s), can be used to sample the analog signal for each thermistor, for example, and to convert the signal to a temperature.

The temperature sensors 55 are directly inserted into the flowing liquid. These sensors may be solid state, thermistor, thermocouple or resistance-temperature-device (RTD) sensors. Because accurate temperature control is important, the precision of sensors 55 should be selected according to the design goal. For example, for home use, 1% accurate, 1% beta thermistors or better might be used. The accuracy of the cooking temperature is affected by the accuracy of the two temperature sensors, the implementation of the CSE firmware control loop, and the movement of water through the carafe. Including temperature sensors at both the inlet and the outlet of the carafe provides detailed information on how the carafe contents (liquid+food) are affecting the temperature. The difference between the outlet and inlet temperatures is indicative of how homogeneous the temperature is in the carafe. Use of the two temperature sensors helps the CSE ensure that the temperature in the carafe does not overshoot or undershoot in response to load changes. The temperature difference between the outlet and inlet might be relatively great when a large piece of frozen food is in the carafe and the system can adjust accordingly.

Insufficient flow is one failure condition that can arise during device operation which can result in an unsafe overheating of the fluid in the heater assembly. One way that this can happen is by the user turning the device on when the carafe is empty or not properly attached. Similarly a leak in the carafe can allow the liquid to escape during operation. The low-flow condition can also be caused by various events such as a failure of the pump or pump relay, valve failure, or an obstruction or leak in the plumbing in the base. Therefore, a valuable safety feature that can be included in embodiments of the invention automatically prevents heater operation either when there is no flow or inadequate flow lasting longer than a predetermined period of time. This feature prevents overheating of the fluid in the heater assembly. After detecting inadequate flow and shutting down the heater, the CSE preferably should have a means to alert the user through the user display 11 or by some other means such as an audible signal. The low-flow state can be detected using any standard means of flow detection. The overheating of fluid in the pump can also be detected by use of a temperature sensor positioned in or very near the pump. In alternative embodiments a proximity sensor can also be included that detects the presence of the carafe engaged with the base as a required condition for operation.

Figure 5:
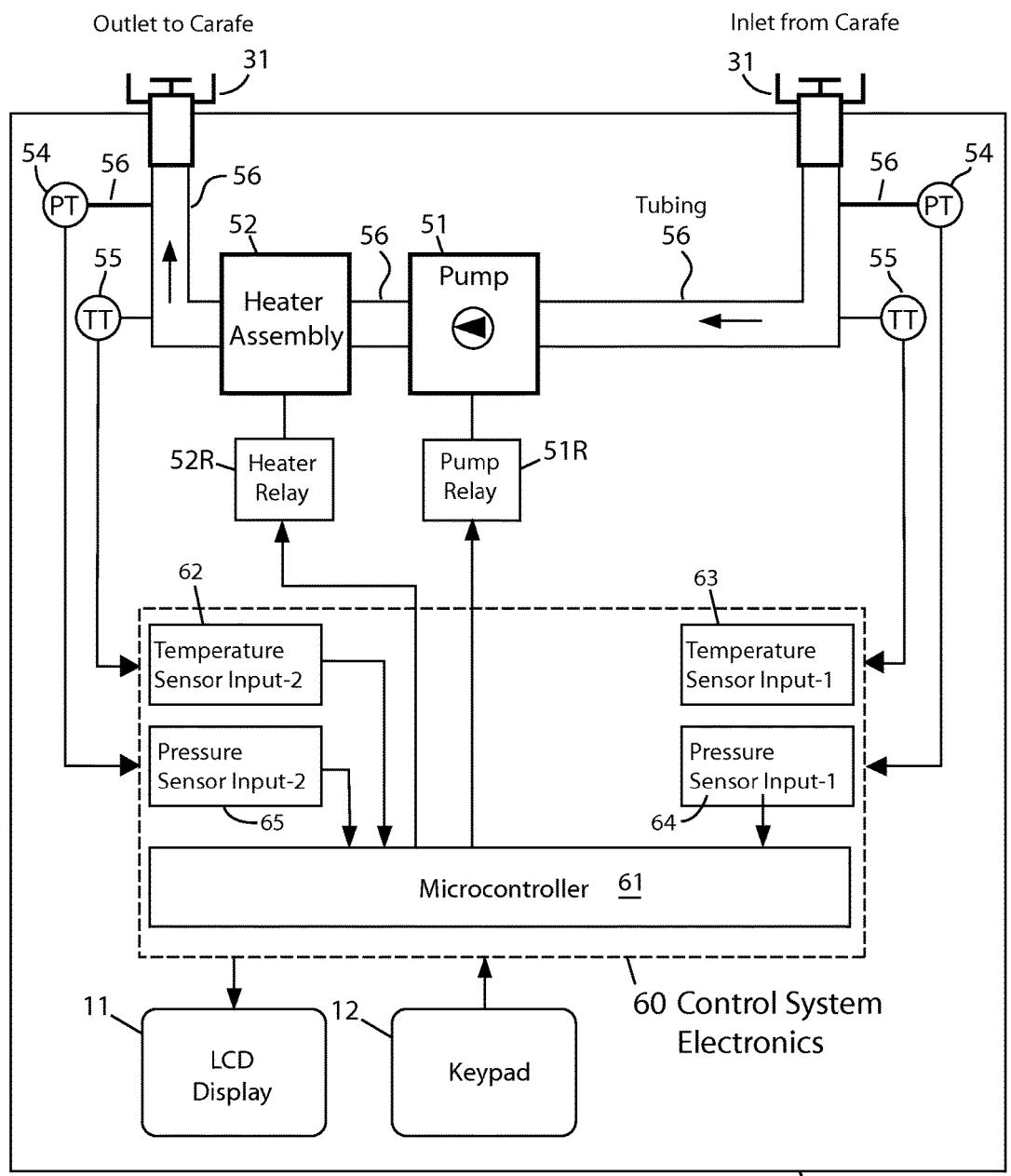
FIG. 5 is a schematic illustration of selected components of a base unit according to a first embodiment of the invention.
Figure 6:
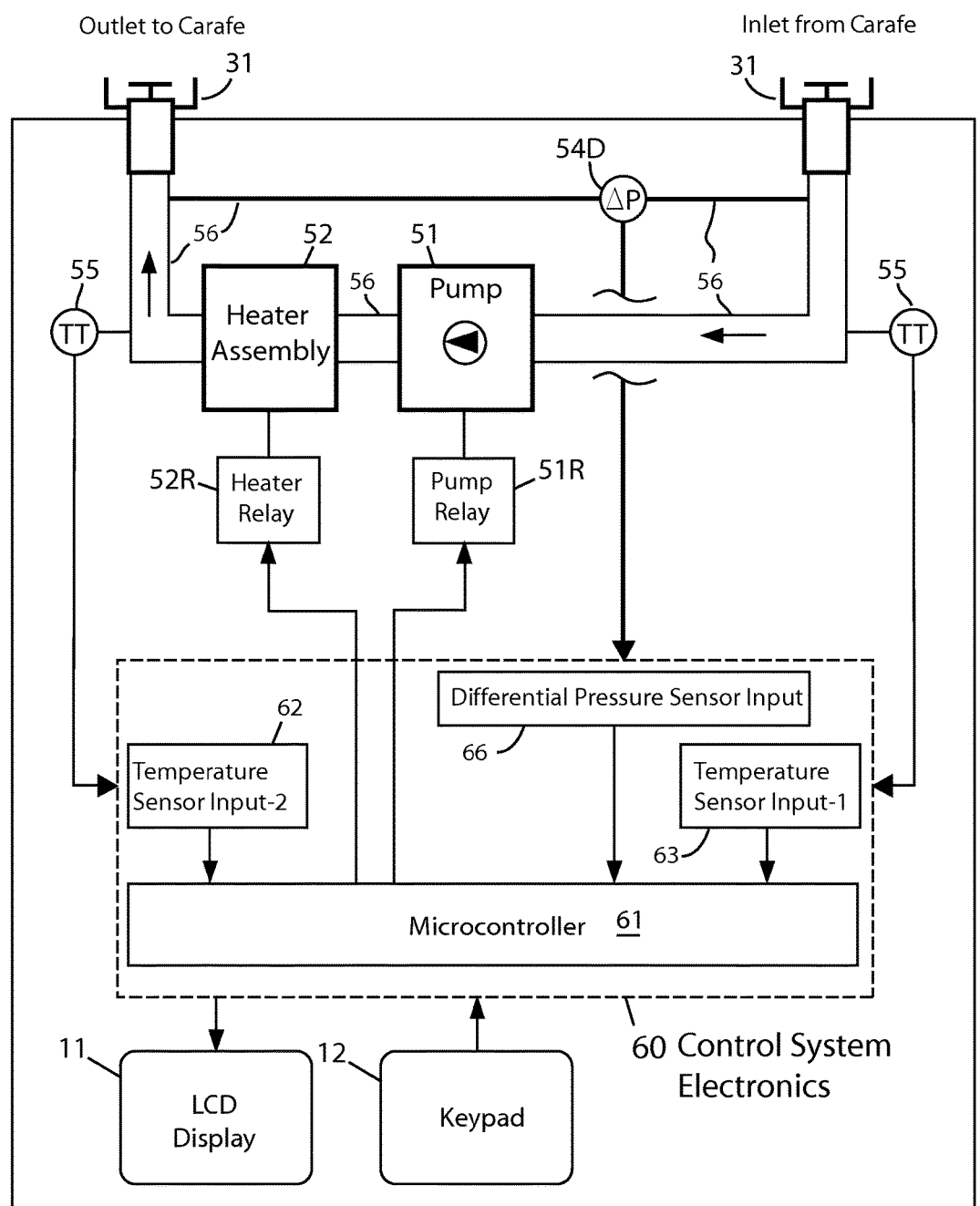
FIG. 6 is a schematic illustration of selected components of a base unit according to a second embodiment of the invention.

The embodiments of the invention that are illustrated in FIGS. 5 and 6 use the difference between the pressure at the intake and output sides of the pump to detect flow conditions. The embodiment of FIG. 5 uses the two pressure sensors 54 positioned near BSAAs 31 to sense the respective pressures. The sensors 54 access the fluid pressure through separate tubes 56. The sensors 54 are electrically connected to the pressure sensor input blocks 64, 65 in the CSE which compares the two measured pressures and responds accordingly. If the two pressures are equal (within a selected delta), the CSE interprets that as indicative of a low-flow condition and executes the heater shutdown and failure signaling according to the particular selected embodiment.

The embodiment of FIG. 6 is similar to that of FIG. 5, but it uses a differential pressure sensor (DPS) 54D that is connected by separate tubes 56 to the inlet and outlet sides, instead of pressure sensors 54. DPS 54D is electrically connected to the differential pressure sensor input block 66 in the CSE. Various differential pressure sensors can be used. The magnitude of each pressure and the delta between them can vary significantly depending upon the details of specific embodiment including the size of the carafe, the pump flow rate, the tubing sizes, length of tubing runs, etc. In an embodiment sized for home use the difference in pressure can be expected to on the order of 0.5 psi when the pump is operating and the liquid is flowing sufficiently. In an alternative embodiment a DPS can be used that has a built-in electrical switch that either opens or closes the switch at a predetermined pressure difference. The state of the switch can be used as a low-flow indicator. In addition, various embodiments could be created which include the use of any of the various types of flow sensors available, such as flapper-valve, rotating vane or Doppler-based sensors.

The CSE monitors the temperature sensors to determine proper operation of the heater and respond to a heater-fault condition. In the event that the temperature gradient between the inlet and outlet sensors during heating (i.e. when the heater is on) is lower than a predetermined positive value, or if the CSE is unable to maintain the desired temperature for longer than predetermined period, a heater-fault condition is detected, and preferably reported to the operator via the display 11. In an alternative embodiment the rate of warming during the initial phase can be monitored for a normal/expected rate of increase and a decision can be made to turn the heater off and alert the operator if the expected increase is not occurring. As an additional safety measure, preferably both flow and expected temperature rates can be monitored.

Except where noted otherwise the user controls, programming and display can be implemented according to the prior art of programmable cooking and heating devices. In a simple alternative embodiment, a device according to the invention might function with a preset thermostat and nothing more than an on/off switch as a user control. A slightly more complicated user control interface would allow the user to set the temperature. Similarly various levels of user input for the timing of the process can be provided. More complicated designs would allow a full range of user controls for temperature, timing, changes of temperature at selected times, etc. In embodiments of the invention, the CSE implements operator/user interaction, via the display 11 and keypad 12. A standard LCD display can be used. The keypad 12 can be implemented with standard momentary push-button switches or membrane key-switches, for example. The user interface, which is implemented in part by the firmware, preferably allows the operator to set or change the cooking temperature, start, stop or pause cooking. In addition, the display can inform the user of the current operating temperature and accumulated cooking time. In the event of a failure condition (flow or heater), the user interface display can inform the operator of the failure condition. The User Interface may also be used to set configuration options, such as the temperature scale (e.g., degrees Fahrenheit or degrees Celsius), display backlight brightness, etc. The CSE electronics can be implemented on a custom printed circuit board assembly. The firmware is created using standard tools for programming microcontrollers.

Embodiment with Inlet and Outlet in an Integrated Valve Assembly

Figure 7:
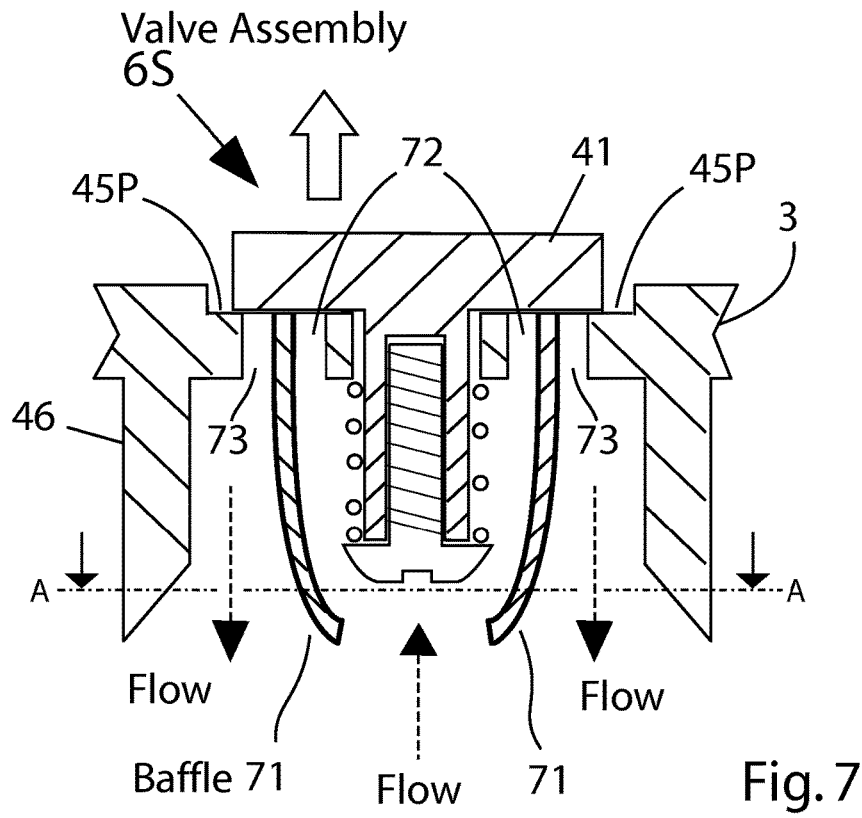
FIG. 7 is an illustration of a cross section view of a second embodiment of a valve assembly used in a carafe in an embodiment of the invention in which the inlet and outlet ports are integrated into a single valve assembly. The valve assembly is shown in the normally closed position with the carafe detached from the base unit.
Figure 8:
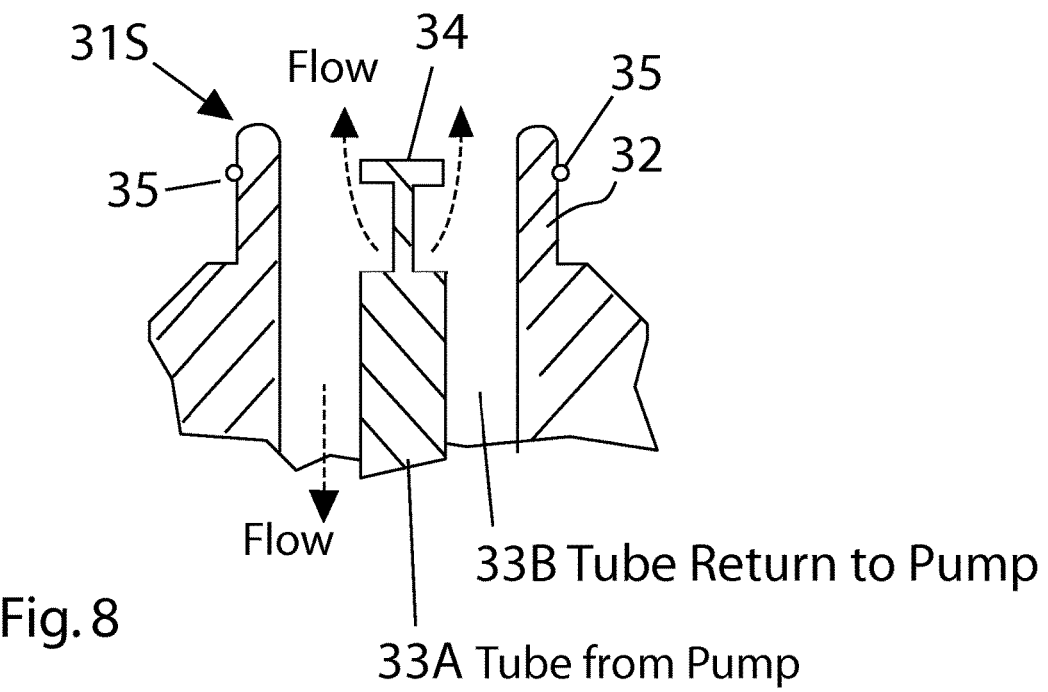
FIG. 8 is an illustration of a cross section view of a second embodiment of a mating base valve actuator assembly (corresponding to the valve assembly of FIG. 7) used in an embodiment of the invention. The valve actuator assembly is shown as it appears with the carafe detached from the base unit.

In the embodiment described above and as shown in FIG. 1A, the inlet and outlet ports each have a valve assembly 6 in the carafe and are placed a selected distance apart. In an alternate embodiment, as illustrated in FIG. 1C, the inlet and outlet ports are combined into an integrated inlet and outlet valve assembly 6S. The corresponding base actuator valve assembly is 31S. FIG. 7 is an illustration of a cross section view of an embodiment of an integrated valve assembly 6S. FIG. 8 is an illustration of a cross section view of the mating embodiment of a base valve actuator assembly 31S used with integrated valve assembly 6S. The conical-shaped baffle 71 is used to separate the inflow and outflow when the carafe with integrated valve assembly 6S is attached to the base unit and mated with base valve actuator assembly 31S. The baffle 71 is shown as being part of the integrated valve assembly 6S, but alternatively the baffle 71 or its equivalent could be designed as part of the base valve actuator assembly 31S. The inflow and outflow from the pump in the base are through concentric tubes 33A, 33B.

Figure 9:
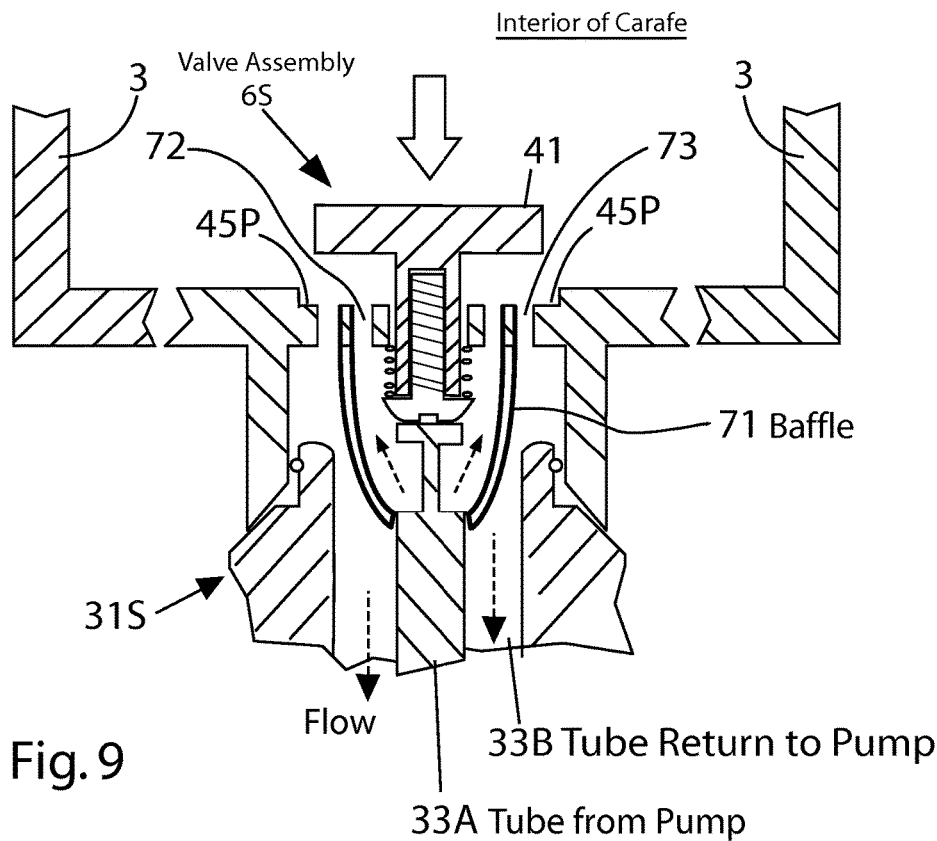
FIG. 9 is an illustration of a cross section view of the second embodiment of valve assembly of FIG. 7 and base valve actuator assembly of FIG. 8 used in an embodiment of the invention. The valve assembly is shown in the open position with the carafe attached to the base unit for normal operation.

FIG. 9 is an illustration of a cross section view of the embodiment of valve assembly 6S of FIG. 7 and base valve actuator assembly 31S of FIG. 8 used in an embodiment of the invention. The valve assembly is shown in the open position with the carafe attached to the base unit.

Figure 10:
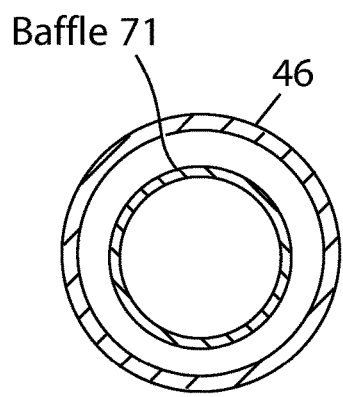
FIG. 10 is an illustration of a cross section view of the second embodiment of valve assembly of FIG. 7 taken along the plane A-A labeled in FIG. 7.

FIG. 10 is an illustration of a cross section view of the second embodiment of valve assembly of FIG. 7 taken along the plane A-A labeled in FIG. 7. This illustration shows that the baffle 71 has a generally circular cross section, as does protruding ring 46.

Figure 11:
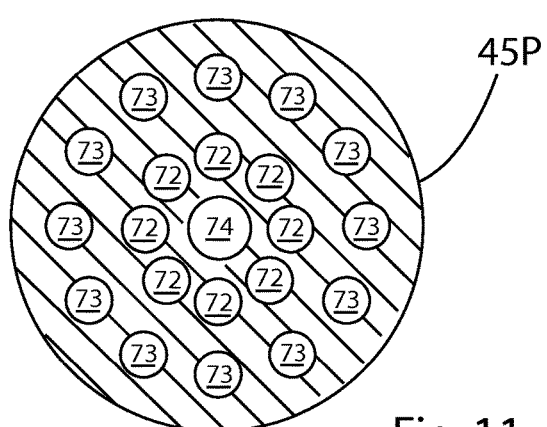
FIG. 11 is an illustration of a top view of the portion of the carafe bottom under the piston used with the embodiment of the valve assembly of FIG. 7.

FIG. 11 is an illustration of a top view of the mating surface 45P portion of the carafe bottom which is under the piston (not shown) used with the embodiment of valve assembly 6S of FIG. 7. The shaft of piston 41 passes through aperture 74. The inner ring of holes 72 are disposed to conduct flow from inside the baffle 71 when the valve is open, i.e., when the piston 41 is pushed up from the mating surface 45P (as shown in FIG. 9). The outer ring of holes 73 are disposed to conduct return flow outside of the baffle 71 when the valve is open.

The flow into the carafe is through tube 33A which fits snugly in the circular bottom opening of baffle 71. The valve actuator portion 34 (see FIG. 8) pushes the piston 41 to open the valve in the same manner as in the first embodiment using valve assembly 6. The flow out of tube 33A is directed through holes 72 in the mating surface 45P of the carafe bottom. The return flow is through the ring of holes 73, which are outside of the baffle 71, down into tube 33B which returns the fluid to the pump (and the heater). Tube 33B is sized to allow tube 33A to fit inside. Tube 33A should be held in position inside of tube 33B by means such as guides or standoffs (not shown) that do not obstruct the flow through tube 33B.

Figure 12:
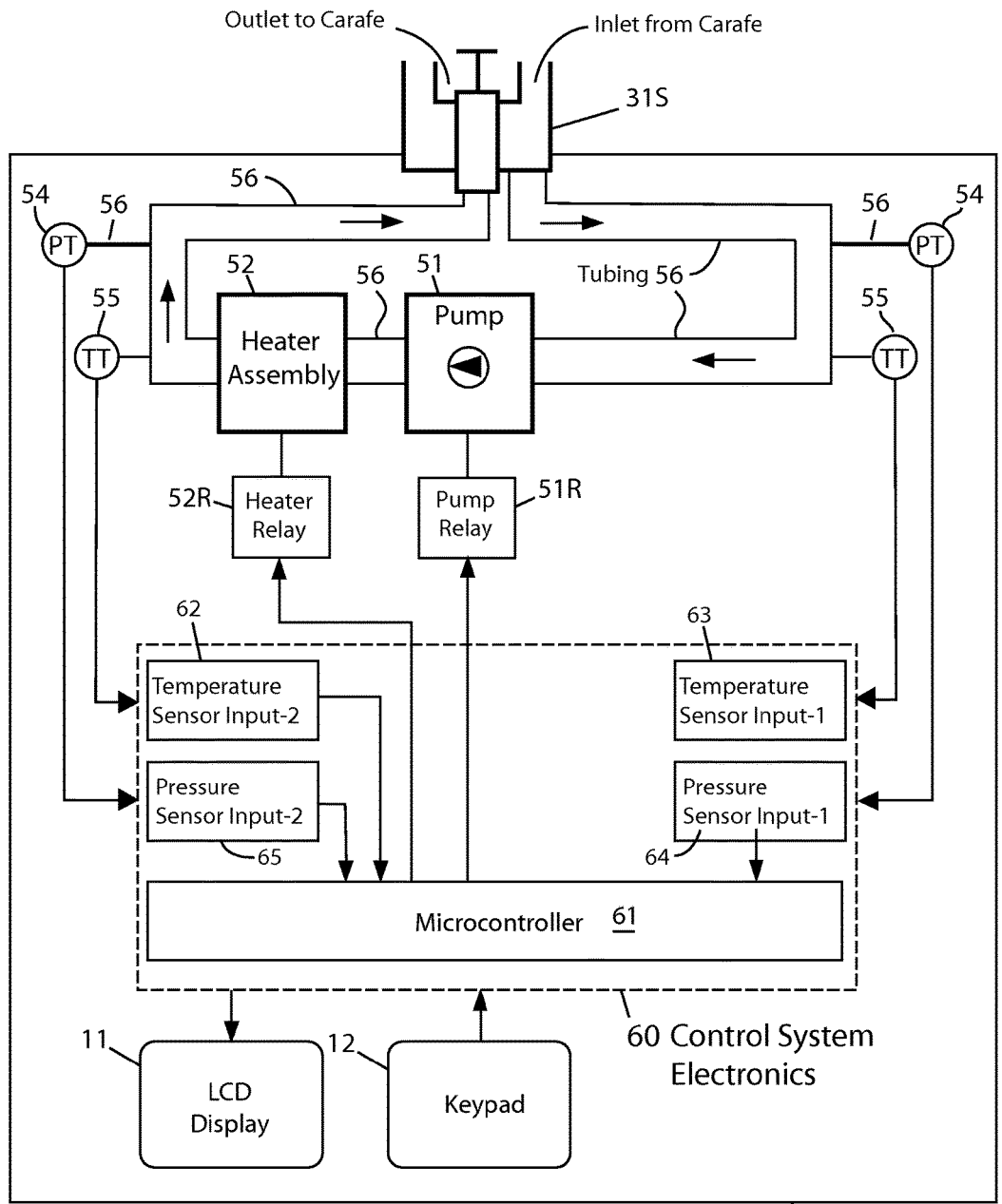
FIG. 12 is a schematic illustration of selected components of a base unit according to an embodiment of the invention using an integrated inlet and outlet base actuator valve assembly.

FIG. 12 is a schematic illustration of selected components of a base unit according to an embodiment of the invention using an integrated inlet and outlet base actuator valve assembly 31S. Except for the changes in tubing associated with the use of the base actuator valve assembly 31S, the components and function of this base unit are the same as shown in FIG. 5. An embodiment of a base unit similar to that shown in FIG. 6 can also be used with the base actuator valve assembly 31S with the same changes in tubing shown in FIG. 12.

The invention claimed is:

1. A device for heating food comprising:
 a removable carafe for holding a fluid in contact with the food, the carafe having a carafe inlet valve and a carafe outlet valve that are biased in a fluid-tight closed position; and
 a self-contained base unit configured to receive the removable carafe including:
  first and second valve actuators respectively arranged to mate with and open the carafe inlet valve and the carafe outlet valve when the carafe is positioned in mating contact with the base unit, the mating contact allowing the fluid to circulate between the base unit and the carafe;
  a pump with an inlet that has a fluid-flow connection to the carafe outlet valve and an outlet that has a fluid-flow connection to the carafe inlet valve when the carafe is positioned in mating contact with the base unit, and wherein the pump circulates fluid through the carafe by drawing fluid from the carafe outlet valve into the base unit and pushing fluid back into the carafe inlet valve when the pump is operating and the fluid-holding carafe is positioned in mating contact with the base unit;
  an electrically powered heating element positioned in serial fluid-flow connection with the pump to selectively heat the fluid circulating through the base unit and back into the carafe inlet valve;
a first temperature sensor positioned for measuring a first temperature of the fluid; and
a control system electrically connected to the pump, the heating element, and the first temperature sensor, the control system operating the pump during operation of the device when the carafe is in mating contact with the base unit to circulate the fluid from the carafe through the base unit and back into the carafe, the control system selectively supplying electrical power to the heating element to heat the fluid flowing through the base unit to maintain the first temperature of the fluid near a target temperature.

2. The device of claim 1 further comprising a first pressure sensor positioned to measure a first pressure on an inlet side of the pump and a second pressure sensor positioned to measure a second pressure on an outlet side of the pump, the first and second pressure sensors generating first and second signals that are electrically connected to the control system and the control system determining that the fluid is flowing through the base unit when the difference between first and second signals is greater than a predetermined value.

3. The device of claim 2 wherein the control system switches off electrical power to the heating element if the difference between first and second signals is lower than the predetermined value for more than a predetermined period of time indicating that the fluid is not flowing through the base unit.

4. The device of claim 1 further comprising a differential pressure sensor having a first input positioned on an inlet side of the pump and a second input positioned on an outlet side of the pump, the differential pressure sensor generating a signal representative of a difference between pressures at the first and second inputs, the signal being electrically connected to the control system and the control system detecting the fluid flowing through the base unit based on the signal being greater than a predetermined value.

5. The device of claim 4 wherein the control system switches off electrical power to the heating element if the signal is less than the predetermined value for more than a predetermined period of time indicating that the fluid is not flowing through the base unit.

6. The device of claim 1 wherein the carafe inlet valve is positioned in a first location on a bottom surface of the carafe and the carafe outlet valve is positioned in a second location on the bottom surface of the carafe and the first and second valve actuators are respectively positioned on a top surface of the base unit in mating alignment with the carafe inlet valve and the carafe outlet valve to receive the carafe.

7. The device of claim 1 wherein the first temperature sensor is positioned to measure the fluid temperature on first side of the pump and the device further comprises a second temperature sensor positioned for measuring a second temperature of the fluid flowing through the base unit on an opposite side of the pump relative to the first temperature sensor, the second temperature sensor being electrically connected to the control system, and wherein the control system detects a heater-fault condition when a difference between the fluid temperature on the inlet side of the pump and the fluid temperature on the outlet side of the pump is below a threshold value that is indicative of heater operation.

8. A device for heating food comprising:
a removable carafe for holding the food in contact with a fluid, the carafe having a carafe inlet valve and a carafe outlet valve that are biased in a fluid-tight closed position; and
a base unit for receiving the carafe, heating the fluid and circulating the fluid, the base unit including a pump, a heater and first and second valve actuators arranged to mate with and open the carafe inlet valve and the carafe outlet valve to establish a circulation path for the fluid from the carafe outlet valve through the pump and heater and back through the carafe inlet valve when the carafe is positioned in mating contact with the base unit and the device is operating.

9. The device of claim 8 wherein the carafe inlet valve is positioned in a first location on a bottom surface of the carafe and the carafe outlet valve is positioned in a second location on the bottom surface of the carafe and the first and second valve actuators are respectively positioned on a top surface of the base unit in mating alignment with the carafe inlet valve and the carafe outlet valve to receive the carafe.

10. The device of claim 8 further comprising:
a first temperature sensor positioned for measuring a first temperature of the fluid; and
a control system electrically connected to the pump, the heater, and the first temperature sensor, the control system operating the pump during operation of the device when the carafe is in mating contact with the base unit, the control system selectively supplying electrical power to the heater to heat the fluid flowing through the base unit to maintain the first temperature of the fluid near a target temperature.

* * * * *